(No Model.)  C. H. BRAITHWAITE.  2 Sheets—Sheet 1.
LAWN MOWER.
No. 435,389.  Patented Sept. 2, 1890.
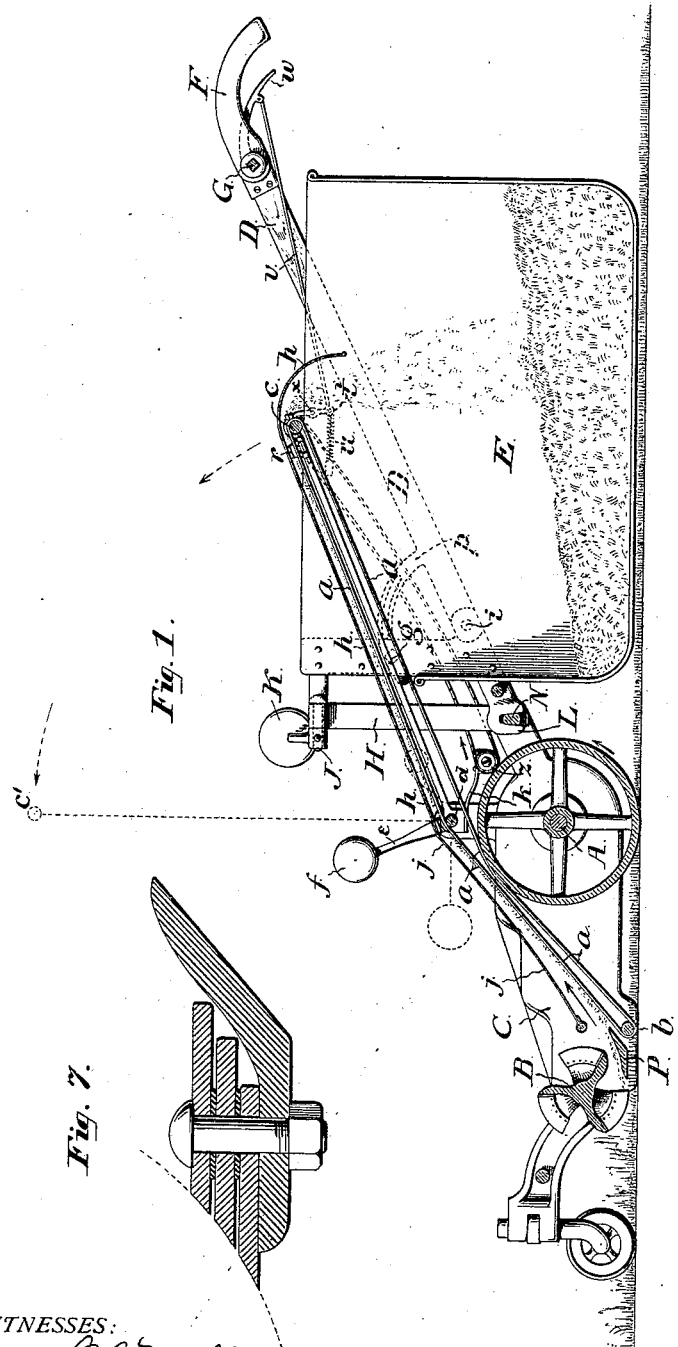
WITNESSES:
James H. Bell
A. E. Paige
INVENTOR
Charles H. Braithwaite
by his atty
Henry H. Paul Jr.

(No Model.) 2 Sheets—Sheet 2.
C. H. BRAITHWAITE.
LAWN MOWER.
No. 435,389. Patented Sept. 2, 1890.
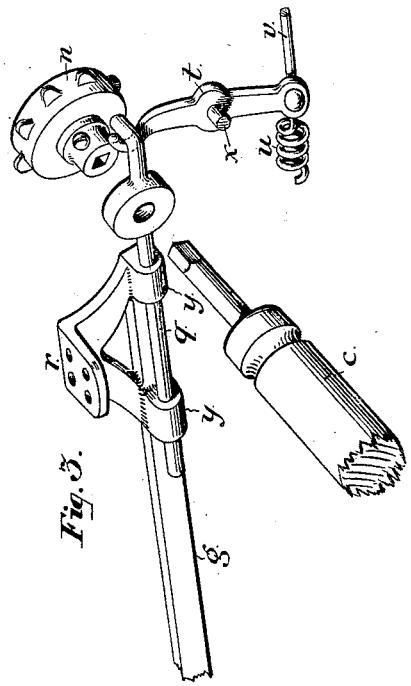
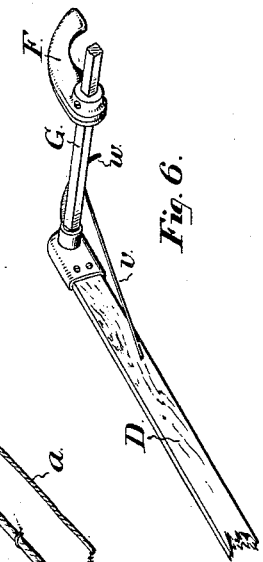
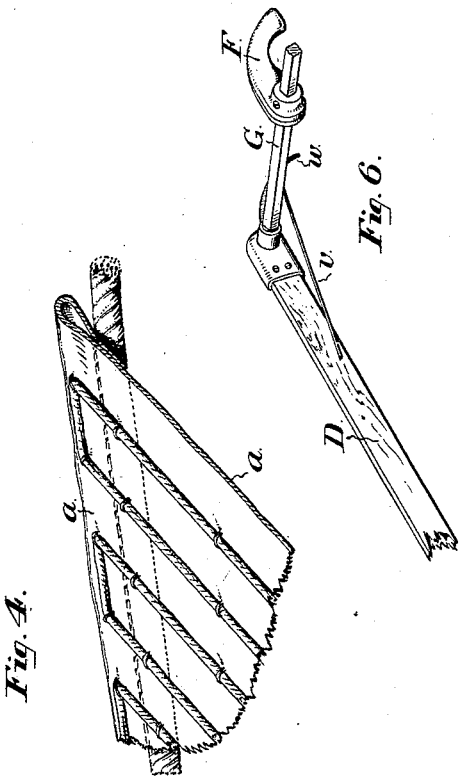
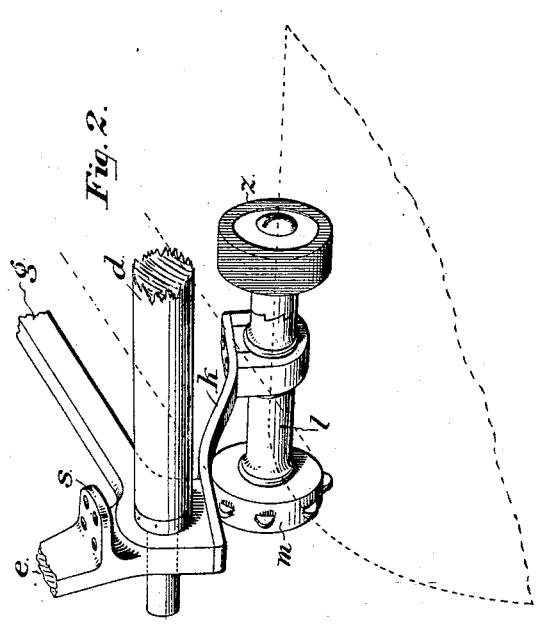
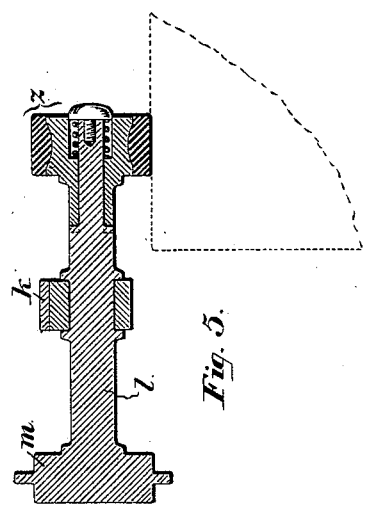
WITNESSES:
James H. Bell
A. E. Paige
INVENTOR
Charles H. Braithwaite
by his atty
Henry N. Paul Jr.

UNITED STATES PATENT OFFICE.

CHARLES H. BRAITHWAITE, OF ARDMORE, PENNSYLVANIA.

LAWN-MOWER.

SPECIFICATION forming part of Letters Patent No. 435,389, dated September 2, 1890.

Application filed November 6, 1889. Serial No. 329,399. (No model.)

*To all whom it may concern:*

Be it known that I, CHARLES H. BRAITHWAITE, of Ardmore, Montgomery county, Pennsylvania, have invented certain new and useful Improvements in Lawn-Mowers, of which the following is a specification, reference being had to the accompanying drawings.

In the drawings, Figure 1 represents a central vertical section through a lawn-mower having my device applied, and Figs. 2, 3, 4, 5, 6, and 7 are enlarged drawings of certain details.

My invention relates especially to a series of devices and attachments to lawn-mowers whereby the small bits of grass which have been cut and which it is desirable shall be collected are transferred by means of an endless band to a grass-receptacle, and also means whereby this grass-receptacle may be overturned and emptied of its contents at convenient intervals.

A, Fig. 1, is the main driving-shaft of the mower.

B is the shaft upon which the cutting-blades revolve, and C the side frame of the machine.

The species of mower to which my invention is shown by the drawings as applicable is that in which there are two separate handles; but it may also be applied, with slight modifications, to mowers having a single handle.

D is the handle-bar farthest from the observer.

Between the two handle-bars is placed a large grass-receptacle E. The handle-bars are firmly braced together, and between them the grass-receptacle is rigidly attached. As in large machines this grass-receptacle is of considerable width, I employ the device shown in detail in Fig. 6 to prevent the handles from being at an inconvenient distance apart. Only one of the handles (the one not shown in the drawings) is attached to the end of its handle-bar. The other F, Fig. 6, is laterally adjustable upon the cross-rod G, which connects the upper ends of the handle-bars. By sliding this handle F upon the cross-rod the handles may be placed at any convenient distance apart. The handle is fixed in position by a set-screw.

$a$ is an endless traveling band or apron, slightly narrower than the width of the machine, the upper side of which, when the machine is in motion, moves continually from immediately behind the cutting-blades to the center of the grass-receptacle. It is carried by rollers $b$ $c$. The lower of these $b$ is borne by the side frame of the machine and attached just behind the cutting-blades.

A short distance above the main shaft A there is a revolving bar $d$, which is carried by upward extensions of the side frame. This bar $d$ carries three arms $g$ $e$ $k$, the longest of which $g$, together with its fellow at the other side of the machine, carry at their extremities the roller $c$, around which the upper end of the endless band travels. The arm $e$ carries a counter-weight $f$, and the arm $k$ carries a friction-roller bearing upon the main driving-wheel of the machine, and from which motion is communicated to the endless traveling band, as will be hereinafter explained.

Upon the shaft A the main driving-wheel of the machine is placed. It consists of a solid cylinder of the width of the machine. Its width gives ample friction-surface, and its weight causes it to act as a roller, leveling the sod as the machine passes over. Its upper surface also acts as an idler-pulley supporting the under side of the apron.

The handle-bars D are not fixedly attached to the main body of the machine, but at their lower extremities is a hook L, which rests upon a V-shaped cross-bar N, which extends between the side frames of the machine. In addition to the support thus obtained at this point, the grass-receptacle, and with it the handle-bars, is swung or pivoted at one of its forward upper corners to the heavy upright H, extending from the corresponding rear corner of the main body of the machine. The handles are also vertically adjustable. The handle-bars are jointed and by means of a plate and set-screw can be maintained at any convenient angle. This arrangement is shown in dotted lines in Fig. 1, where the handle-bar is jointed at $i$. The upper part carries the curved slotted plate $p$, which may be fixed by a set-screw to an extension of the lower part of the handle-bar.

Upon the pivot J the grass-receptacle, and with it the handles and handle-bars, can be revolved and completely overturned, thus emptying it of its contents. In order to facilitate this operation, the weight of the grass-receptacle is balanced upon this pivot by the counter-weight K. When the grass-receptacle becomes full, the person who is guiding the machine lifts the receptacle and the handle-bars from their support on the cross-bar N and overturns the receptacle, swinging it upon the pivot J. When it is emptied it is allowed to return to its former position.

When the grass-receptacle is to be overturned, it is necessary that the roller $c$, carrying the upper end of the revolving apron, shall be removed from its position above the center of the receptacle, in order to allow the revolution of the latter. It is on this account that the roller $c$ is carried by the long arm $g$, pivoted upon the shaft $d$. The counter-weight $f$ is slightly more than sufficient to balance the weight of this long arm, and consequently whenever the latter is released from the catch which holds it in its position over the receptacle it flies up, assuming the position $c'$. The catch which holds it in its lower position is shown in detail in Fig. 3. It consists of the trip-lever $t$, pivoted at $x$ to the side of the grass-receptacle. The upper end of this lever forms a hook which engages with the end of the arm $g$, while its lower end plays between the spring $u$ and wire $v$, which runs to a small handle $w$, placed just alongside of the handle F. Upon pulling this handle $w$ upward the catch is released from the hook and the arm $g$ swings out of the way.

The roller $c$ is not rigidly affixed to the end of the arm $g$, but its bearing is attached to a rod $q$, which is capable of playing backward and forward through the hollow lugs $y$ $y$ at the end of the arm $g$. When this is held down by the catch, the pressure of the spring $u$ tends to draw the bearing of the roller $c$ forward, and thus creates sufficient tension to keep the endless traveling band $a$ taut and yet allow for the shrinkage which must necessarily occur when the apron becomes wet. This tension-bearing is similar upon both sides of the machine. The bar $x$, upon which the trip-levers are pivoted, extends across the machine and causes both catches to work in unison, although the wire $u$ and handle $w$ are preferably placed only on one side.

The traveling band derives its motion from a sprocket-wheel $n$, Fig. 3, at the end of the shaft carrying the roller $c$, which is acted upon by a chain driven by another sprocket-wheel $m$, Fig. 3, carried by the shaft $l$, borne by the arm $k$. At that point of the shaft $u$ situated directly over the main driving-shaft of the machine there is a friction-roller $z$. This roller, when the arm $g$ is in its lower position, bears quite heavily against the driving-wheel of the machine and receives its motion from it. Its connection with the sprocket-wheel $m$, however, is not rigid; but by means of the ratchet attachment shown in section in Fig. 5 the teeth of this ratchet are so adjusted that the friction-roller turns the sprocket-wheel $m$ whenever the roller $z$ derives its motion from the forward motion of the machine. When, however, the machine is pulled backward the teeth of the ratchet slip and no reverse motion is given to the wheel $m$, and consequently the apron does not travel backward, which would cause the bits of grass lying upon it to be deposited upon the ground.

Upon the outward surface of the traveling band $a$ are sewed transverse cords, as shown in Fig. 4. This roughens the surface and facilitates the carrying upward of the bits of grass by the upward revolution of the band. This upper surface of the band is also protected from drafts of wind by the canvas curtain $j$, which protects the lower part of it, and the tin shield $h$, the upper end of which is curved down around the roller $c$. This shield is fastened to the plates $r$ $s$, the former at the upper end of the arm $g$, Fig. 3, the latter at the lower end of the same, as shown in Fig. 2.

Another feature of my improvement consists of the peculiar construction of the straight edge P, against the edge of which the cutting-blades revolve. Instead of being made of one piece, this is constructed, as shown in Fig. 7, by bolting together several plates. (The drawings show three.) The plates are then ground off to the proper curve, and thus form separate cutting-surfaces. The plates may be separated by any thin layer of metal, not projecting as far, however, as the cutting-edges. This greatly increases the cutting-power of the machine, as a blade of grass which fails of being cut by one edge is cut by the next. If preferred, this device may be used upon the revolving cutting-blades as well as upon the fixed straight edge.

I am aware that machines have previously been made in which there is an endless traveling apron which carries the bits of grass which have been cut to a grass-receptacle. I do not claim this feature broadly.

The special advantage of my device is that the grass-receptacle may be overturned by the person driving the machine without his moving from his position in the rear of the machine, it being only necessary for him to pull the handle $w$, which trips the catch $t$, whereupon the weight $f$ immediately causes the arm $g$ to fly upward, carrying with it the roller $c$, the upper end of the apron $a$, sprocket-chain $p$, and the shield $h$, thus leaving the receptacle perfectly free to be overturned.

Having thus described my device, what I claim, and desire to secure by Letters Patent, is—

1. In a lawn-mower, the handle-bars D, detachably adjusted at their lower ends to the frame of the mower, and the grass-receptacle E, situated between said handle-bars and swinging together, with both of them upon a pivot carried by the upright H, attached to the mower-frame, substantially as described.

2. In a lawn-mower, the combination of the endless traveling band $a$, the rollers $b\ c$, upon which said band runs, and the arm $g$, carrying the upper one of said rollers and swinging upon the shaft $d$ as a pivot, and the hinged grass-receptacle E, as and for the purposes described.

3. In a lawn-mower, the combination of the endless band $a$, traveling from near the edge of the cutting-blades to within or above the grass-receptacle E, the rollers $b\ c$, upon which said band runs, the swinging arms $g$, which carry the roller $c$, which is driven from the friction-wheel $z$, and the arm $k$, which carries said friction-wheel, and which causes it to swing in unison with the arm $g$ into or out of contact with the main roller of the machine, substantially as described.

4. In a lawn-mower, the combination of the grass-receptacle E, which is capable of revolution upon the pivot J, and the endless band $a$, traveling from near the edge of the mower to a point over the grass-receptacle, and the rollers $b\ c$, upon which said band runs, the latter of which is carried upon the arms $g$, which swing upon a shaft fastened to the main frame of the mower, substantially as described.

5. In a lawn-mower, the combination of an endless band $a$, traveling around a roller near the edge of the blades of the mower, and also around a roller $c$, carried by swinging arms $g$, balanced by the counter-weight $f$, and which is capable of being released by a catch $t$, so as to fly upward from its position over the grass-receptacle, substantially as described.

6. In a lawn-mower, the combination of the endless band $a$, the rollers $b\ c$, upon which said band runs, the swinging arms $g$, carrying the rollers, one of said rollers mounted in a sliding bearing and provided with a tension-spring $v$, and the hinged grass-receptacle E, as and for the purposes described.

7. In a lawn-mower, the compound cutting-edge consisting of two or more blades superimposed on one another, and having their edges ground to a curve or bevel, so as to present a series of single cutting-edges successively to the object to be cut, substantially as described.

8. In a lawn-mower, the combination of the grass-receptacle E, situated between the handle-bars D, and the cross-rod G, upon which one of the handles F is laterally adjustable, as and for the purposes described.

CHARLES H. BRAITHWAITE.

Witnesses:
JAMES H. BELL,
HENRY N. PAUL, Jr.